H. E. DAVIS.
LOCKING DEVICE FOR MOTOR VEHICLES.
APPLICATION FILED MAY 15, 1916.

1,192,873.  Patented Aug. 1, 1916.

Inventor:
Harry E. Davis,
by Attys.

UNITED STATES PATENT OFFICE.

HARRY E. DAVIS, OF HYATTSVILLE, MARYLAND.

LOCKING DEVICE FOR MOTOR-VEHICLES.

1,192,873.    Specification of Letters Patent.    Patented Aug. 1, 1916.

Application filed May 15, 1916. Serial No. 97,645.

*To all whom it may concern:*

Be it known that I, HARRY E. DAVIS, a citizen of the United States, residing at Hyattsville, Maryland, have invented certain new and useful Improvements in Locking Devices for Motor-Vehicles, of which the following is a specification.

The present invention relates to locking devices for motor vehicles and more particularly to the type of automobile which is provided with an emergency brake operated by a foot pedal.

Heretofore, so far as I am aware, locking devices have usually been applied to the power controlling devices, but such locks do not prevent the machine from being pushed or towed away, and numerous thefts in this manner have come to my attention.

The object of the present invention is to provide a locking device by which the automobile will be rendered absolutely immovable, and I have aimed to accomplish this result in a very simple manner.

The invention includes the novel construction hereinafter described and particularly defined by the appended claims, several embodiments of said invention being illustrated in the accompanying drawings in which—

Figure 1:
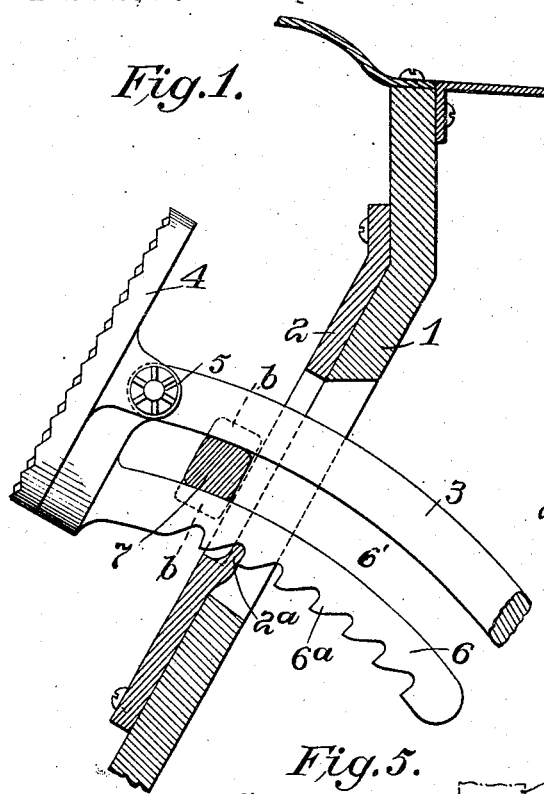
Figure 2:
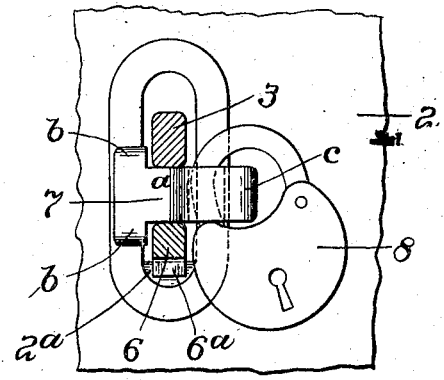
Figure 3:
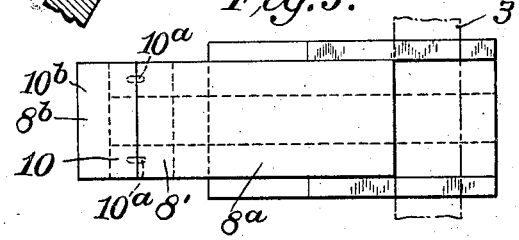
Figure 5:
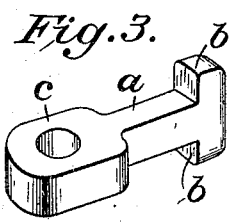
Figure 7:
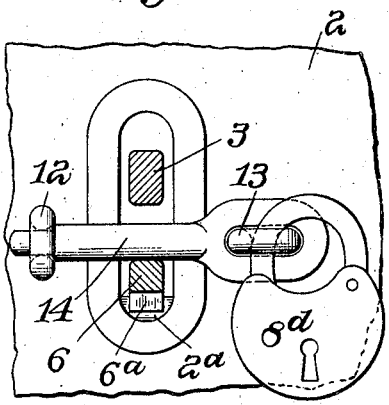
Figures 4, 6:
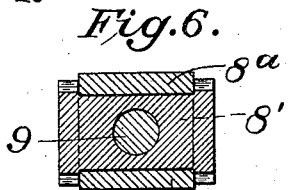

Figure 1 is a sectional elevation of an emergency brake pedal showing one form of my locking device applied thereto. Fig. 2 is a sectional view taken transversely through the brake lever and ratchet bar. Fig. 3 is a detail view of the locking bolt. Figs. 4, 5 and 6 are respectively a side elevation, a plan and a transverse section of a modified form of bolt, and Fig. 7 is a view of a still further modification.

In these drawings the numeral 1 designates the floor board of the ordinary automobile which is usually, in machines having this type of emergency brake, provided with a metal plate 2 having a slot through which the brake lever projects, such lever being indicated at 3 and being designed to operate the brakes in the ordinary or any desired manner.

The brake lever 3 is depressed to apply the brake by a foot treadle or pressure plate 4, which is connected to the end of the lever 3 by a pivot 5, and in order to hold the lever in brake applying position the plate 4 carries, rigidly attached thereto, a ratchet bar 6, provided with teeth $6^a$ adapted to engage a dog or projection $2^a$ formed on or carried by plate 2 at the lower end of the slot therein.

Bars 3 and 6 are concentric with an intervening space 6′ and within this space I insert a locking bolt 7. In Fig. 1 the brake lever is shown as depressed to apply the brakes, being held in brake applying position by the engagement of ratchet bar 6, and dog $2^a$ above referred to. To release the brake it is necessary to rock the foot piece 4 on its pivot and swing ratchet bar 6 upwardly until the teeth are disengaged from the dog. This however cannot be done while the locking bolt 7 is in place as shown in Fig. 1, as will be obvious, and thus the automobile is effectually held against movement by an unauthorized person.

In Figs. 1 to 3 I have shown the bolt as provided with a shank adapted to lie in the space between the levers, and having lateral projections $b$ at one end to bear against the levers at one side; the opposite end of the bolt being flattened and provided with an eye or opening $c$ to receive a padlock 8 as indicated in Fig. 2.

In the form shown in Figs. 4, 5 and 6 I employ a wedge piece $7^a$ as the bolt or member designed to pass between the bars 3 and 6 and thereby render the said member automatically adjustable or adaptable to variations in the width of the space between said bars 3 and 6. A substantially U-shaped or forked member 8 has arms $8^a$ adapted to bear against the sides of bars 3 and 6 in opposition to the thicker edge of the wedge, said arms being non-rotatably connected with the shank of said wedge member. A bolt 9 is screwed into the threaded base in the wedge member and passes through an opening in the head $8^b$ of the forked member. When the wedge member has been placed between the bars 3 and 6, the forked member in place and the bolt screwed into the threaded bore, as shown in Fig. 4, the arms of said forked member are pressed against the faces of bars 3 and 6, thus drawing said wedge member firmly into locking position.

A key piece 10 is mounted in the shank of the bolt to have a limited sliding movement thereon between the eye $9^a$ and the head $8^b$ of the forked member, and said key piece has means adapted to interlock with the head of the forked member such as one or more projections $10^a$, to engage a corresponding groove or recess (or recesses) in said head $8^b$. Said key piece also has flanges $10^b$ adapted to engage or lie on opposite sides of the eye of the bolt. While the bolt is being screwed in to draw the parts into locking position, said key piece 10 is drawn outwardly toward the eye of the bolt to permit the rotary movement of said bolt. After the parts are in locking position the key piece is moved to the right (Fig. 4) to cause it to interlock with the head of the forked member and the loop of the padlock 8ᶜ being passed through the eye said key piece is held in interlocking position and the parts against rotation as long as the padlock is in position.

In Fig. 7 I have shown a still further modification. In this form I secure two staples 12 and 13 to the floor boards and use a locking bolt 14 having one end adapted to be passed into the loop of staple 12 and having its other end provided with an eye or loop adapted to be passed over staple 13 and held thereto by padlock 8ᵈ, said staples being so placed in the floor board as to bring the locking bolt against the ratchet bar 6 when held in brake applying position through its engagement with the dog a², thereby preventing the release of said ratchet bar so long as the locking bolt is held in position.

Having thus described my invention what I claim is:

1. In combination a brake lever, a foot piece pivoted thereto, a ratchet bar rigidly carried by said foot piece and extending substantially parallel with said brake lever, a fixed dog with which said ratchet bar engages, and a locking bar insertible between said brake lever and ratchet bar to hold said ratchet bar in engagement with said dog.

2. In combination a brake lever, a foot piece pivoted thereto, a ratchet bar rigidly carried by said foot piece and extending substantially parallel with said brake lever, a fixed dog with which said ratchet bar engages, and a wedge shaped locking bar insertible between said brake lever and ratchet bar to hold said ratchet bar in engagement with said dog.

3. In combination a brake lever, a foot piece pivoted thereto, a ratchet bar rigidly carried by said foot piece and extending substantially parallel with said brake lever, a fixed dog with which said ratchet bar engages, and a wedge shaped locking bar insertible between said brake lever and ratchet bar to hold said ratchet bar in engagement with said dog, a forked member slidably carried by said wedge shaped locking bar, a screw bolt for moving said forked member on said locking bar, a shiftable key piece for keying said bolt to said forked member, and a lock for holding said key piece in keying position.

In testimony whereof, I affix my signature.

HARRY E. DAVIS.

Copies of this patent may be obtained for five cents each, by addressing the "Commissioner of Patents, Washington, D. C."